(12) United States Patent
Mine

(10) Patent No.: US 8,689,489 B2
(45) Date of Patent: Apr. 8, 2014

(54) GLASS RUN FOR MOTOR VEHICLE

(75) Inventor: Kiminori Mine, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/237,569

(22) Filed: Sep. 20, 2011

(65) Prior Publication Data
US 2012/0079772 A1    Apr. 5, 2012

(30) Foreign Application Priority Data

Sep. 30, 2010    (JP) ................................ 2010-221184

(51) Int. Cl.
*B60J 10/04* (2006.01)
(52) U.S. Cl.
USPC ............................ 49/490.1; 49/489.1; 49/441
(58) Field of Classification Search
USPC ................. 49/440, 441, 479.1, 489.1, 490.1, 49/495.1, 475.1
See application file for complete search history.

(56) References Cited

U.S. PATENT DOCUMENTS

| 5,217,786 | A | * | 6/1993 | Keys | 428/122 |
| 5,475,947 | A | * | 12/1995 | Dupuy | 49/490.1 |
| 5,493,814 | A | * | 2/1996 | Christian | 49/479.1 |
| 6,115,969 | A | | 9/2000 | Nozaki | |
| 6,243,989 | B1 | | 6/2001 | Nozaki | |
| 6,493,992 | B2 | * | 12/2002 | Goto | 49/441 |
| 6,598,348 | B2 | * | 7/2003 | Palicki | 49/479.1 |
| 6,612,074 | B1 | * | 9/2003 | Kaye et al. | 49/441 |
| 6,996,936 | B1 | * | 2/2006 | Maass | 49/479.1 |
| 7,487,615 | B2 | * | 2/2009 | Watanabe et al. | 49/441 |
| 7,571,569 | B2 | * | 8/2009 | Hiramatsu et al. | 49/479.1 |
| 7,581,354 | B2 | * | 9/2009 | Yamada | 49/479.1 |
| 7,650,718 | B2 | * | 1/2010 | Eguchi et al. | 49/479.1 |
| 8,051,606 | B2 | * | 11/2011 | Maa.beta et al. | 49/479.1 |
| 8,104,229 | B2 | * | 1/2012 | Minami et al. | 49/479.1 |
| 8,256,163 | B2 | * | 9/2012 | Eguchi et al. | 49/479.1 |
| 2001/0001917 | A1 | * | 5/2001 | Goto | 49/440 |
| 2001/0013203 | A1 | * | 8/2001 | Griesbach et al. | 49/440 |
| 2005/0072053 | A1 | * | 4/2005 | Filipczak et al. | 49/490.1 |

(Continued)

FOREIGN PATENT DOCUMENTS

JP    10-226239 (A)    8/1998
JP    2005-178703 A    7/2005

(Continued)

OTHER PUBLICATIONS

Japanese Office Action dated Jan. 29, 2013.

*Primary Examiner* — Katherine Mitchell
*Assistant Examiner* — Justin Rephann
(74) *Attorney, Agent, or Firm* — McGinn Intellectual Property Law Group, PLLC

(57) ABSTRACT

A glass run includes an outer side wall, an inner side wall and a bottom wall, which define a generally U-shaped cross-section. A first outer seal lip and an inner seal lip are respectively formed in the outer side wall and the inner side wall. An extension part is formed to extend from an open end of the outer side wall of the glass run for attachment to vertical side portions of the door frame in an extending direction thereof, and a second outer seal lip is formed to extend from a tip end of the extension part in a direction of a front side of a vehicle body such that the second outer seal lip seals the door glass on a front side of a part sealed with the first outer seal lip.

13 Claims, 3 Drawing Sheets

(56) References Cited

U.S. PATENT DOCUMENTS

| | | |
|---|---|---|
| 2005/0188622 A1* | 9/2005 | Nestell ............................ 49/441 |
| 2005/0229496 A1* | 10/2005 | Tashima et al. ................. 49/441 |
| 2006/0021281 A1* | 2/2006 | Tamaoki et al. ................ 49/441 |
| 2007/0006534 A1* | 1/2007 | Hiramatsu et al. .............. 49/414 |
| 2007/0251152 A1* | 11/2007 | Takase et al. ................... 49/441 |
| 2009/0108625 A1* | 4/2009 | Minami et al. ............. 296/146.2 |
| 2010/0126077 A1* | 5/2010 | Eguchi et al. ................ 49/479.1 |

FOREIGN PATENT DOCUMENTS

| | | |
|---|---|---|
| JP | 2008-183979 A | 8/2008 |
| JP | 2008-239104 (A) | 10/2008 |
| JP | 2009-1143 (A) | 1/2009 |
| JP | 2009-241676 (A) | 10/2009 |

\* cited by examiner

# GLASS RUN FOR MOTOR VEHICLE

CROSS-REFERENCE TO RELATED APPLICATION

This application is related to and claims priority from Japanese patent Application No. 2010-221184 incorporated herein by reference.

BACKGROUND OF THE INVENTION

1. Field of the Invention

The present invention relates to a glass run adapted to be attached to an inner periphery of a door frame of a motor vehicle to guide a door glass as it is raised and lowered.

2. Description of Related Art

As shown in FIG. 1, a glass run 10 is attached to an inner periphery of a door frame 12 of a vehicle door 14 for guiding a door glass 16 as it is raised and lowered. FIG. 2 shows a configuration of a conventional glass run 10, and FIG. 3 and FIG. 4 are cross-sectional views of the conventional glass run 10 that is attached to a straight portion of the door frame 12.

As shown in FIG. 3, conventionally, the glass run 10 is fitted in a channel 18 of the door frame 12 to guide the door glass 16 upwardly and downwardly, and provide a seal between the door glass 16 and the door frame 12. As shown in FIG. 2, the glass run 10 is generally formed by joining extruded straight sections 20 adapted to be attached along an upper side portion, a front vertical side portion and a rear vertical side portion of the door frame 12 with corner sections 22, each being formed by molding, in conformity with corners 24 of the door frame 12.

A door weather strip (not shown) is attached to an outer periphery of a door panel and the door frame 12, and/or an opening trim weather strip (not shown) is attached to a flange provided in a door opening portion of a vehicle body, thereby sealing between the vehicle door 14 and the vehicle body.

As shown in FIG. 3, the straight section 20 of the glass run 10 includes an outer side wall 26, an inner side wall 28 and a bottom wall 30, and has a generally U-shaped cross-section. A first outer seal lip 32 is provided to extend from an open end of the outer side wall 26 towards an interior of the glass run 10. And a second outer seal lip 34 is provided to extend from the open end of the outer side wall 26 towards an opening of the main body of the glass run 10. In addition, an inner seal lip 36 is provided to extend from an open end of the inner side wall 28 towards the interior of the glass run 10.

The outer side wall 26, the inner side wall 28 and the bottom wall 30 of the glass run 10 are inserted in the channel 18 provided in the door frame 12, and at least one part of an exterior surface of the respective walls is brought into pressure contact with an interior surface of the channel 18, thereby holding the glass run 10. As shown in FIG. 3, the channel 18 is provided by bending the door frame 12 or attaching a door molding thereto.

And, in order to fit and hold the glass run 10 in the channel 18 upon inserting the glass run 10 in the channel 18, an outer holding lip 38 and an inner holding lip 40 are provided in the outer side wall 26 and the inner side wall 28 respectively in the straight sections 20 of the glass run 10.

The door glass 16 slides in the interior of the glass run 10 and is held such that both surfaces of a peripheral part thereof are sealed with the first outer seal lip 32, the second outer seal lip 34 and the inner seal lip 36 (see Japanese patent application laid-open No. Hei 10-226239, for example). In particular, in vertical sections of the door frame 12, the second outer seal lip 34 covers level differences and gaps between the door glass 16 and the first outer seal lip 32 to provide a seal against wind and rainwater flowing along the door glass 16 from the front side of the vehicle body.

However, as shown in FIG. 4, where an L-shaped channel 42 is secured to the door frame 12 for attaching a glass run 44, an outer garnish 46 is provided on an outer side of the door frame 12 for covering an outer side surface of the channel 42 and the door frame 12. A tip end 48 of the outer garnish 46 is extended on the front side of a base of a second outer seal lip 50 (towards an opening of the glass run 44) to cover the same.

And the glass run 44 includes an outer side wall 52, an inner side wall 54 and a bottom wall 56, and has a generally U-shaped cross-section. A first outer seal lip 58 is provided to extend from an open end of the outer side wall 52 towards an interior of the glass run 44. And the second outer seal lip 50 is provided to extend from the open end of the outer side wall 52 towards an opening of the glass run 44. In addition, an inner seal lip 60 is provided to extend from an open end of the inner side wall 54 towards the interior of the glass run 44 (see Japanese patent application laid-open No. 2009-1143, for example).

Where level differences formed in the second outer seal lip 50 and the tip end 48 of the outer garnish 46 against a surface of the door glass 16 become large, the second outer seal lip 50 and the tip end 48 of the outer garnish 46 make a great angle relative to the door glass 16, and consequently, while a motor vehicle is running at high speeds, air flowing from the door glass 16 to surfaces of the door frame 12 produces a turbulent air to generate wind noises.

SUMMARY OF THE INVENTION

It is an object of the present invention to provide a glass run capable of making air flowing along a door glass and a door frame gentle, thereby reducing resultant wind noises.

In order to achieve the above-described object, according to a first aspect of the present invention, a glass run for use in a motor vehicle, which is adapted to be attached along an inner periphery of a door frame of a vehicle door for guiding a door glass as it is raised and lowered includes a main body having an outer side wall, an inner side wall and a bottom wall, which define a generally U-shaped cross-section. A first outer seal lip and an inner seal lip are respectively formed in the outer side wall and the inner side wall so as to respectively extend from open ends of the outer side wall and the inner side wall in an interior of the main body with a generally U-shaped cross-section, thereby respectively sealing outer and inner surfaces of the door glass.

An extension part is provided to extend from a tip end of the outer side wall of the glass run for attachment to vertical side portions of the door frame in an extending direction of the outer side wall, and a second outer seal lip is provided to extend from a tip end of the extension part in a direction of a front side of a vehicle body such that the second outer seal lip seals the outer surface of the door glass on a front side of a part sealed with the first outer seal lip.

With the arrangement of the first aspect of the present invention, the glass run for use in a motor vehicle, which is adapted to be attached along an inner periphery of a door frame of a vehicle door for guiding a door glass as it is raised and lowered, includes a main body having an outer side wall, an inner side wall and a bottom wall, which define a generally U-shaped cross-section, and a first outer seal lip and an inner seal lip are respectively formed in the outer side wall and the inner side wall so as to respectively extend from open ends of the outer side wall and the inner side wall in an interior of the main body with a generally U-shaped cross-section, thereby respectively sealing outer and inner surfaces of the door glass.

Therefore, when the vehicle door is closed, an end of the door glass can be accommodated in the interior of the main body of the glass run, which has the outer side wall, the inner side wall and the bottom wall to define a generally U-shaped cross-section, whereby the door glass can be securely held in an upper side portion, vertical portions and corner portions of the door frame. And when the door glass is raised and lowered, the first outer seal lip and the inner seal lip contact the door glass, thereby sealing between the door frame and the door glass.

The extension part is formed to extend from the open end of the outer side wall of the glass run for attachment to vertical side portions of the door frame in an extending direction of the outer side wall, and the second outer seal lip is formed to extend from the tip end of the extension part in the direction of the front side of the vehicle body such that the second outer seal lip seals the outer surface of the door glass on the front side of the part sealed with the first outer seal lip.

With this arrangement, the extension part can locate the second outer seal lip on the front side of the vehicle body, and by prolonging the length of the second outer seal lip and the extension part, the angle of inclination of a plane closing a gap between a surface of the door glass and a surface of the door frame can be decreased, and consequently, air can smoothly flow along the surfaces of the door glass and the door frame to reduce wind noises. In addition, in the outer side wall of a vertical side section of the glass run, the second outer seal lip can close the gap between the surface of the door glass and the surface of the door frame. The first outer seal lip and the second outer seal lip can doubly seal the outer side surface of the door glass, whereby rainwater, dust and noises can be prevented from intruding into a vehicle compartment to improve the sealing properties. And a gap between the door glass or a garnish provided on the outer side of the door glass, and the glass run can be covered.

According to a second aspect of the present invention, the extension part is formed so as to shift outwardly of the outer side wall in parallel therewith.

With this arrangement, since the extension part is formed so as to shift outwardly of the outer side wall in parallel therewith, a difference in level between the door frame or the garnish, and the extension part can be decreased, and the second outer seal lip and the extension part can decrease the angle of inclination of the plane closing the gap between the surface of the door glass and that of the door frame so that air can smoothly flow along the surfaces of the door glass and the door frame to reduce wind noises.

According to a third aspect of the present invention, a garnish is provided on the outer side of the door frame, and a tip end of the garnish contacts the exterior surface of the extension part.

With this arrangement, the garnish is provided on the outer side of the door frame, and the tip end of the garnish contacts the exterior surface of the extension part. Therefore, outer side surfaces of the door frame and the channel can be covered with the garnish, thereby improving the appearance therearound. In addition, the tip end of the garnish contacts the exterior surface of the extension part so that the tip end of the garnish can be securely held to cover the gap between the garnish and the glass run, thereby ensuring the sealing properties.

And the second outer seal lip can be extended on the front side of the tip end of the garnish so that the angle of inclination of the plane defined by the surface of the second outer seal lip and that of the tip end of the garnish is decreased to cover a difference in level between the surface of the door glass and that of the garnish, whereby air can smoothly flow along the surfaces of the door glass and the door frame to reduce wind noises.

According to a fourth aspect of the present invention, a base of the second outer seal lip is located on a front side of the tip end of the garnish.

With this arrangement, since the base of the second outer seal lip is located on the front side of the vehicle body, as compared with the tip end of the garnish, the second outer seal lip can be extended long, the length of an inclined plane formed between the surface of the second outer seal lip and that of the tip end of the garnish can be prolonged, and the angle of inclination thereof is decreased, whereby air can smoothly flow along the outer surfaces of the door glass and the door frame to reduce wind noises.

According to a fifth aspect of the present invention, the extension part has a recess in an outer surface thereof such that the tip end of the garnish contacts the recess, while providing a gap between the tip end of the garnish and a front end of the recess.

With this arrangement, the extension part has a recess in its outer surface such that the tip end of the garnish contacts the recess, while providing a gap between the tip end of the garnish and a front end of the recess. Therefore, where the dimensions of the garnish and the glass run after assembled scatter, the tip end of the garnish can securely contact the recess of the extension part, whereby the second outer seal lip can be retained with the tip end of the garnish. Since the recess is formed in the exterior surface of the extension part, the thickness of the extension part can be decreased so that the weight of the glass run can be reduced, thereby contributing to the weight reduction of the motor vehicle.

According to a sixth aspect of the present invention, the extension part has an extending length ranging from 3 to 5 mm.

With this arrangement, since the extension part is extended by a length ranging from 3 to 5 mm, the extension part and the second outer seal lip can be extended on the front side of the tip end of the garnish and the open ends of the door frame, whereby the inclined plane defined by surface of the second outer seal lip and that of the tip end of the garnish can be made long, and the angle of inclination of the inclined plane can be decreased. As a result, air can smoothly flow along the surfaces of the door glass and the door frame to reduce wind noises. Where the length of the extension part is less than 3 mm, the end of the garnish cannot securely contact the extension part, considering scattering in dimensions. Where the length of the extension part exceeds 5 mm, the extension part is exposed from the garnish and the door frame to deteriorate the appearance therearound.

According to a seventh aspect of the present invention, the glass run is a glass run attached to a rear vertical side portion of a front door.

With this arrangement, since the glass run is attached to the rear vertical side portion of the front door, air can smoothly flow along the surfaces of the door glass and the door frame in the rear vertical side portion of the front door to reduce wind noises while a motor vehicle is running.

As described above, by prolonging the second outer seal lip and the extension part, the angle of inclination of the plane defined with the second outer seal lip and the extension part and adapted to close a gap between the surface of the door glass and the surface of the door frame can be decreased so that air can smoothly flow along the surfaces of the door glass and the door frame to reduce wind noises.

In addition, since the extension part is formed to extend from the open end of the outer side wall in an extending direction of the outer side wall, and the second outer seal lip is formed to extend from the tip end of the extension part on the front side of the vehicle body, the gap between the surface of the door glass and the surface of the door frame can be closed with the second outer seal lip, whereby the outer side surface of the door glass can be doubly sealed, and consequently, the sealing properties are improved.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
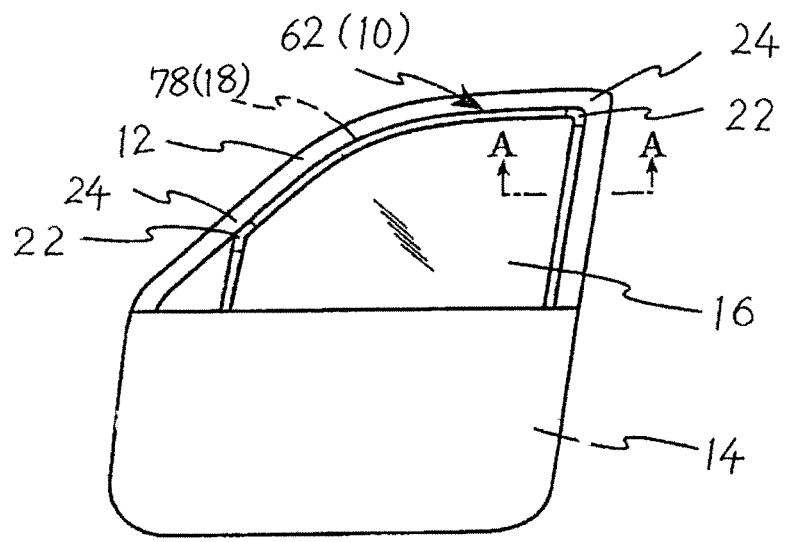
FIG. 1 is a front view of a door of a motor vehicle.
Figure 2:
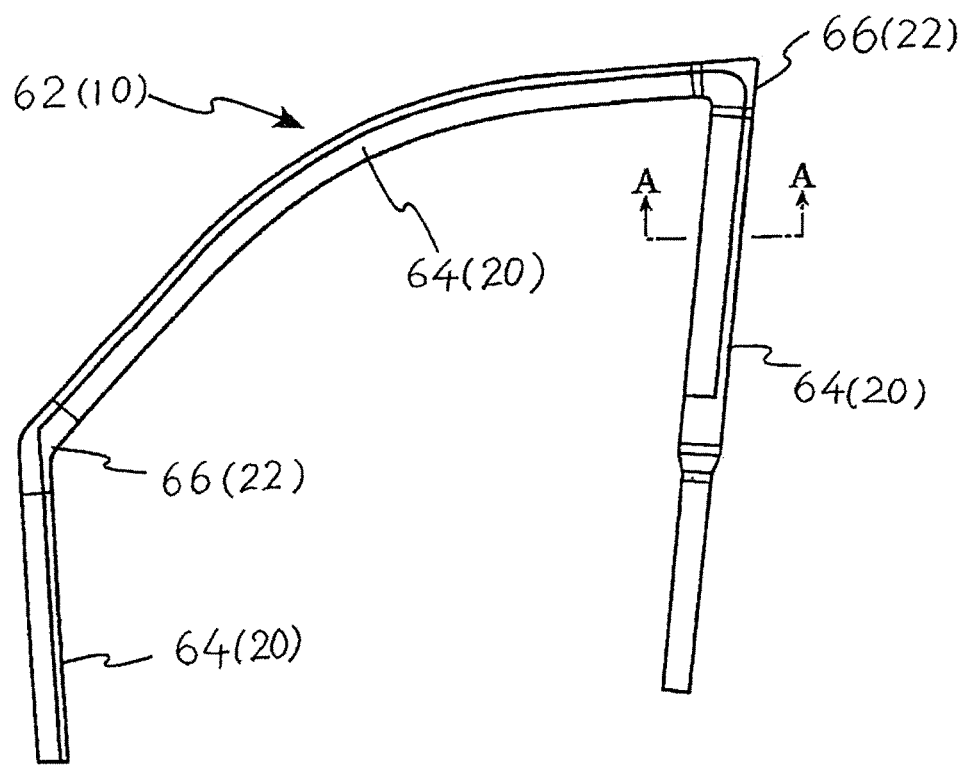
FIG. 2 is a front view showing one embodiment of a glass run in accordance with the present invention.
Figure 3:
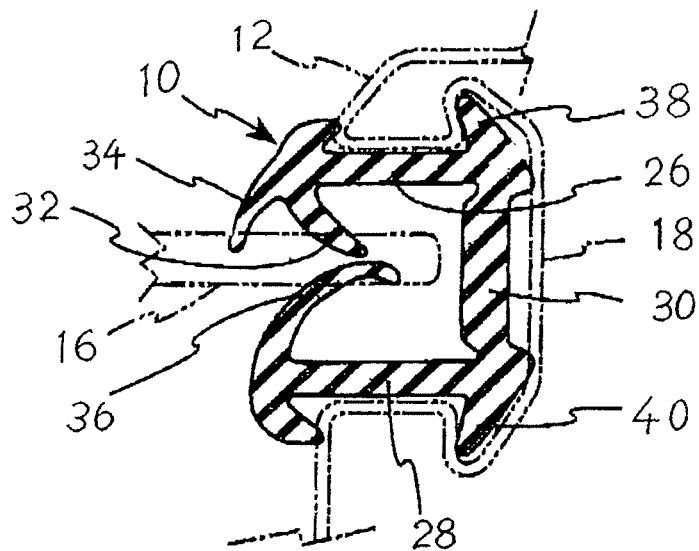
FIG. 3 is a cross-sectional view of a conventional glass run that is attached to a vertical side portion of a door frame.
Figure 4:
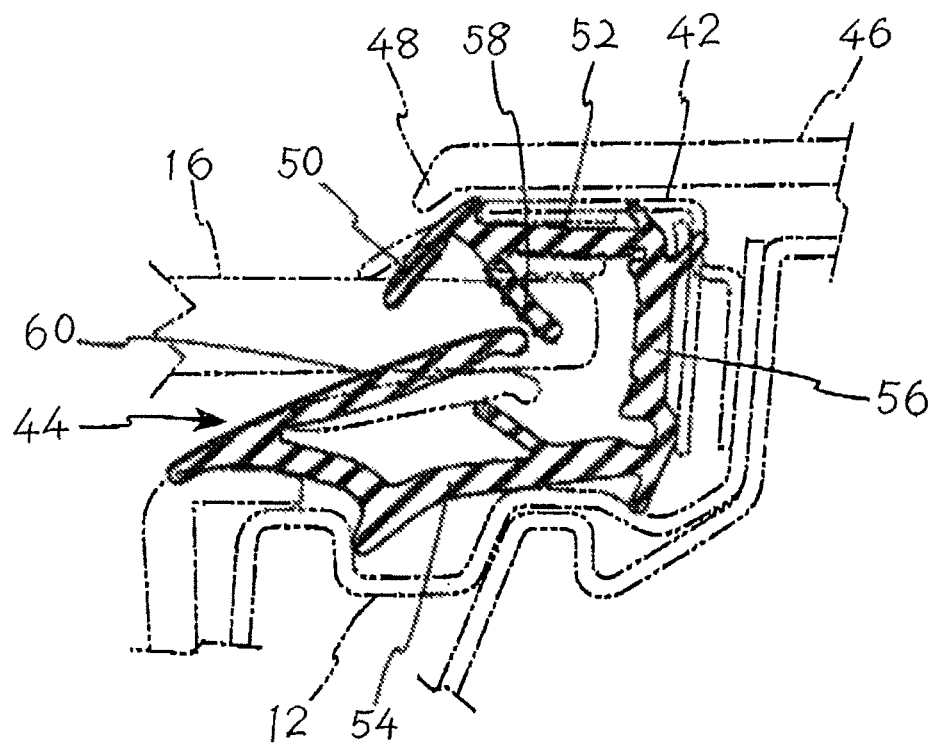
FIG. 4 is a cross-sectional view of another conventional glass run that is attached to a vertical side portion of a door frame.

One embodiment of the present invention will be explained with reference to FIG. 1, FIG. 2 and FIG. 5. FIG. 1 is a front view of a door 14 of a motor vehicle. FIG. 2 is a front view of a glass run 62 for use in a front door, which is to be attached to a door frame 12 of the door 14. As shown in FIG. 1, the door frame 12 is provided in an upper part of the door 14, and a door glass 16 is raised and lowered therealong. The glass run 62 is attached along an inner periphery of the door frame 12 to guide the door glass 16 as it is raised and lowered, and provide a seal between the door glass 16 and the door frame 12.

As shown in FIG. 2, the glass run 62 includes straight sections 64 which are formed by extrusion, and corner sections 66 which are formed by molding to join the extruded straight sections 64 to each other in conformity with corners 24 of the door frame 12.

The extruded straight sections 64 are attached to an upper side portion, a rear vertical side portion and a division sash as a front vertical side portion of the door frame 12, respectively.

In order to conform these extruded straight sections 64 to the door frame 12, the corner sections 66 are formed by molding so as to face the front and rear corners 24 to join the straight sections 64 to each other. The corner sections 66 of the glass run 62 are attached to the corners 24 of the door frame 12.

Hereinafter, the present embodiment will be explained based on the straight section 64 adapted to be attached to the rear vertical side portion of the door frame 12 of a front door 14.

Figure 5:
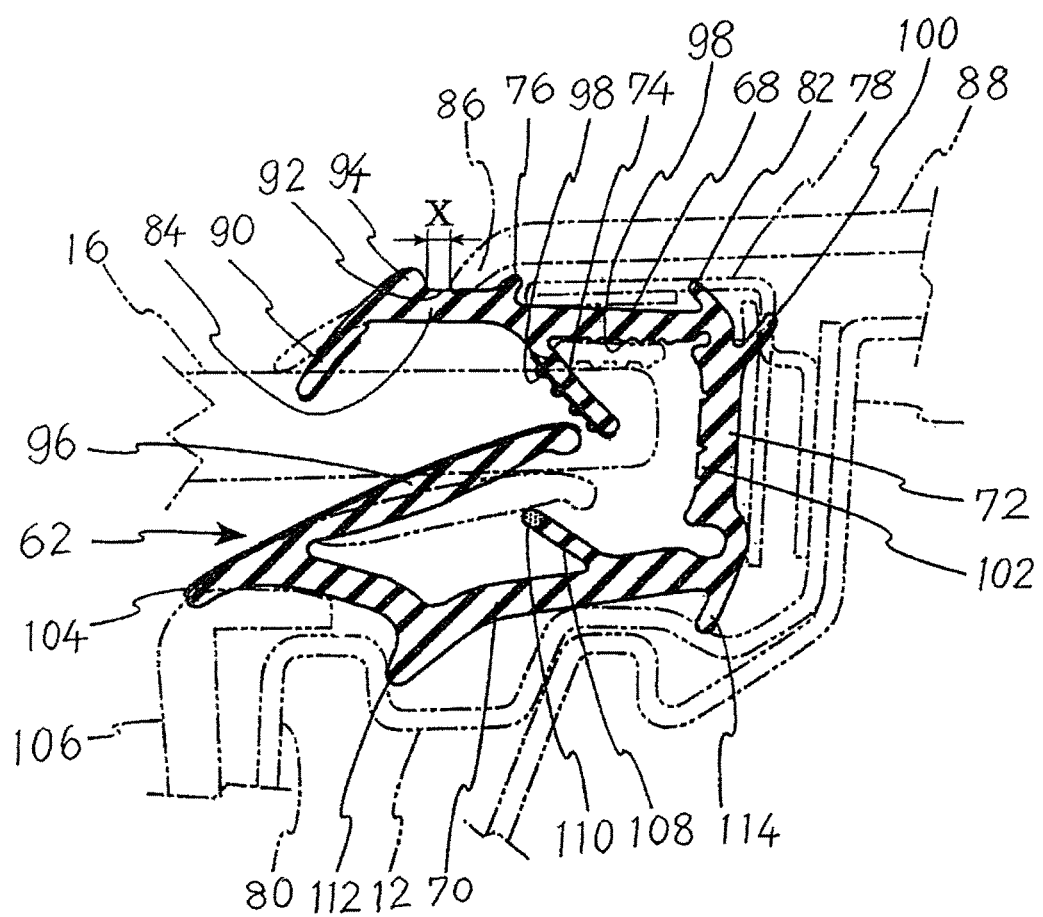
FIG. 5 is a cross-sectional view of one embodiment of a glass run in accordance with the present invention, taken along line A-A of FIGS. 1 and 2, which is attached to a vertical side portion of a door frame.

As shown in FIG. 5, the straight section 64 of the glass run 62 includes a main body composed of an outer side wall 68, an inner side wall 70 and a bottom wall 72, which defines a generally U-shaped cross-section. The inner side wall 70 is formed to have a width and a thickness greater than those of the outer side wall 68, and the generally U-shaped cross-section is asymmetrical such that an inner side thereof is greater than an outer side thereof.

The main body of the glass run 62 has a substantially identical cross-section in both the straight section adapted to be attached to the upper side portion of the door frame 12 and the straight sections adapted to be attached to the vertical side portions thereof.

The outer side wall 68 of the glass run 62 is formed to have a generally plate-shaped cross-section.

A first outer seal lip 74 extends from an open end of the outer side wall 68 in an interior of the main body of the glass run 62. And a first outer cover lip 76 extends outwardly from the open end of the outer side wall 68. The first outer cover lip 76 covers a channel 78 secured to a door outer panel 80 and configured to have an L-shaped cross-section. The channel 78 and the door outer panel 80 of the door frame 12 define a generally U-shaped cross section, and the glass run 62 is held therein.

One end of the channel 78 is secured to the door frame 12 and the other end of the channel 78 is folded inwardly like a hairpin and contacts an exterior surface of the outer side wall 68. An outer holding lip 82 is formed on the exterior surface of the outer side wall 68 on the side of the bottom wall 72.

In the present embodiment, the vertical side portion of the door frame 12 does not have a channel with a generally U-shaped cross-section, which has been conventionally provided to hold the glass run, and, as described above, the glass run 62 is held by the end of the door outer panel 80 of the door frame 12, and the channel 78 secured to the door frame 12 with an L-shaped cross-section, which define a generally U-shaped cross section.

An extension part 84 is formed to extend from the open end of the outer side wall 68 in the extending direction thereof. As shown in FIG. 5, the extension part 84 can be made parallel to the outer side wall 68 so as to shift outwardly thereof. In this case, the first outer cover lip 76 outwardly projecting from the open end of the outer side wall 68 can readily cover the end of the channel 78 with an L-shaped cross-section, which is secured to the door frame 12. In addition, an end 86 of a later-described garnish 88 can be made short.

It is preferable that the extension part 84 has a length ranging from 3 to 5 mm. By forming the extension part 84 with this length, the end 86 of the garnish 88 can securely contact the extension part 84. And an inclined plane defined by a later-described second outer seal lip 90, the extension part 84 and the end of the garnish 88 can be made long so that the angle of inclination thereof can be decreased to enable air to flow smoothly from an exterior surface of the door glass 16 to an exterior surface of the door frame 12, thereby reducing resultant wind noises. Where the length of the extension part 84 is less than 3 mm, the end 86 of the garnish 88 cannot securely contact the extension part 84, considering scattering in dimensions thereof. Where the extension part 84 is longer than 5 mm, the extension part 84 is exposed from the garnish 88 and the door frame 12 to deteriorate the appearance therearound.

The second outer seal lip 90 is provided to extend from the end of the extension part 84 obliquely towards a front side of a vehicle body such that its end contacts the door glass 16. The second outer seal lip 90 seals the exterior surface of the door glass 16 on the front side of a part sealed with the first outer seal lip 74 (towards a center of the door glass 16). Therefore, in the vertical side portion of the door frame 12, the second outer seal lip 90 can close a gap between the exterior surface of the door glass 16 and the exterior surface of the door frame 12 so as to seal the exterior surface of the door glass 16 doubly, whereby rainwater, dust and noises can be prevented from intruding inwardly, and the sealing properties can be improved.

The garnish 88 can be provided along the exterior surface of the door frame 12. The exterior surface of the door frame 12 and that of the channel 78 can be covered with the garnish 88 to improve the appearance therearound.

As shown in FIG. 5, the tip end 86 of the garnish 88 contacts the exterior surface of the extension part 84.

A recess 92 is formed in the exterior surface of the extension part 84. The recess 92 is formed between the first outer cover lip 76 provided at the open end of the outer side wall 68 and a second cover lip 94 provided at a tip end of the extension part 84. By virtue of the recess 92, the thickness of the extension part 84 can be decreased, whereby the weight of the glass run 62 can be reduced to contribute to the reduction of the weight of a motor vehicle.

In the state where the tip end 86 of the garnish 88 contacts the recess 92, a gap ("X" shown in FIG. 5) is provided between the tip end 86 of the garnish 88 and an end of the recess 92 (that is a base of the second outer cover lip 94). In the present embodiment, this gap is about 0.8 mm.

By virtue of this gap, the tip end 86 of the garnish 88 can securely contact the recess 92 even when the dimensions of the garnish 88 and the glass run 62 scatter upon forming or assembling the same, whereby the tip end 86 of the garnish 88 can hold the extension part 84 and the second outer seal lip 90. And the tip end 86 of the garnish 88 is prevented from coming off the extension part 84, and surfaces therearound can be made smooth.

Since the tip end 86 of the garnish 88 contacts the recess 92 of the extension part 84 and a difference in level between the garnish 88 and the extension part 84 is decreased, an inclined plane defined by the second outer seal lip 90 and the tip end 86 of the garnish 88 is made smooth, and the angle of inclination thereof is decreased, whereby differences in level from the surface of the door glass 16 to the surface of the garnish 88 are covered with the inclined plane.

By virtue of the extension part 84, the distance between the tip end 86 of the garnish 88 and the tip end of the outer seal lip 90 can be made long, and since a base of the second outer seal lip 90 is located frontwardly of the tip end 86 of the garnish 88, the surface of the second outer seal lip 90 and that of the tip end 86 of the garnish 88 can be made smooth, the length of the inclined plane defined thereby can be prolonged, and the angle of inclination thereof is decreased, whereby air can flow smoothly along the surface of the door glass 16 and that of the door frame 12, and wind noises can be reduced.

As described above, the first outer seal lip 74 obliquely extends from the open end of the outer side wall 68 in the interior of the main body of the glass run 62. And the second outer seal lip 90 obliquely extends from the end of the extension part 84 towards the front side of the vehicle body. When the door glass 16 is raised, and an upper end thereof is inserted in the interior of an upper side portion of the main body of the glass run 62, the exterior surface of the upper end of the door glass 16 can be doubly sealed with this first outer seal lip 74 and the second outer seal lip 90. In addition, an inner seal lip 96 elastically contacts the door glass 16 to provide a seal between the upper end of the door glass 16 and the door frame 12, thereby preventing rainwater and dust from intruding into the interior of the main part of the glass run 62.

In the straight section 64 of the glass run 62 for attachment to a vertical side portion of the door frame 12, a plurality of ridges 98 are formed in a surface of the first outer seal lip 74, which is adapted to contact the door glass 16, namely is on the side of an opening of the main body, so as to extend in a longitudinal direction of the glass run 62. The ridges 98 are formed by extrusion along with the main body of the glass run 62. The ridges 98 can be formed of a later-described low friction sliding material.

With this arrangement, when the door glass 16 is raised to slide along the glass run 62 attached to the vertical side portion of the door frame 12, the contact area between the door glass 16 and the glass run 62 decreases, thereby reducing the sliding resistance therebetween. As a result, generation of noises can be prevented, and smooth rising and lowering of the door glass 16 can be effected. In addition, if the door glass 16 shifts outwardly, or flexes to be strongly pressed against the first outer seal lip 74 due to a curving of the door glass 16, and a negative pressure generated while running of a motor vehicle, smooth rising and lowering of the door glass 16 can be ensured without increasing its sliding resistance.

It is preferable that the ridges 98 of the glass run 62 have a semicircular cross-section. In this case, when the door glass 16 slides, the sliding area between the door glass 16 and the glass run 62 can be decreased, a smooth sliding surface can be effected, generation of noises can be decreased, wear of the ridges 98 can be reduced, and the glass run 62 can be readily molded.

Low friction sliding members are provided on both a surface of the second outer seal lip 90 and a surface of the inner seal lip 96, which contact the door glass 16. These low friction sliding members are formed on the surfaces of the second outer seal lip 90 and the inner seal lip 96 with a thickness of about 0.1 mm by extruding a thermoplastic elastomer containing a high ratio of olefin component, and exhibiting a small sliding resistance together with the material for the glass run 62, or by applying low friction sliding members of urethane resin, etc. to these surfaces. Therefore, when the door glass 16 slides in the interior of the glass run 62, the sliding resistance can be reduced, and consequently, the generation of noises and slippage of the glass run 62 can be prevented.

In addition, ridges 98 may be provided in an interior surface of the outer side wall 68 and a reverse surface of the first outer seal lip 74, and the above-described low friction sliding members may be provided thereon by extruding, application or adhering work. In this case, where the first outer seal lip 74 is pushed by the door glass 16 and is brought into close contact with the outer side wall 68, the first outer seal lip 74 can be prevented from sticking to the outer side wall 68.

The bottom wall 72 is formed into a generally plate-shaped configuration, and a groove is respectively formed between the inner side wall 70 and the bottom wall 72 and between the outer side wall 68 and the bottom wall 72 so as to enable the readily bending therealong. A bottom seal lip 100 is formed in an exterior surface of the bottom wall 72 on the side of the outer side wall 68 to contact a bottom surface of the channel 78, thereby providing a seal between the door frame 12 and the glass run 62.

A low friction sliding member 102 is provided on an interior surface of the bottom wall 72, similarly to the first outer seal lip 74 and the inner seal lip 96, and the low friction sliding member 102 is formed by extrusion or applying urethane resin or other low friction sliding materials. With this arrangement, the sliding resistance of the glass run 62 against the door glass 16 can be reduced.

The inner side wall 70 is made thicker and greater than the outer side wall 68. Therefore, the glass run 62 can be held with a side surface of the door frame 12, and can be securely held with the door frame 12 along with the channel 78.

An inner cover lip 104 is formed to extend from an open end of the inner side wall 70 obliquely upwardly. This inner cover lip 104 is formed so as to cover a bending part of the door outer panel 80 of the door frame 12, and an end of a garnish 106 secured to the door frame 12. With this arrangement, the appearance between the door outer panel 80 and the glass run 62 can be improved.

The inner seal lip 96 obliquely extends from the open end of the inner side wall 70 in the interior of the main body of the glass run 62. The inner seal lip 96 is made longer and thicker than the first outer seal lip 74 so that when the door glass 16 enters the interior of the glass run 62, the door glass 16 can be located outwardly, and consequently, a difference in level between the door frame 12 and the door glass 16 can be reduced. Therefore, air resistance and wind noises can be reduced, and this arrangement is also preferable in design.

An inner sub-seal lip 108 is formed to extend from an interior surface of the inner side wall 70 towards the inner seal lip 96. When the door glass 16 enters the interior of the main body of the glass run 62, the inner sub-seal lip 108 contacts the inner seal lip 96 to prevent the inner seal lip 96 from contacting the interior surface of the inner side wall 70.

In addition, it is preferable that a tip end 110 of the inner sub-seal lip 108 is composed of a low friction sliding member for preventing the inner seal lip 96 and the inner sub-seal lip 108 from closely contacting each other.

A first inner holding lip 112 is formed to project from an exterior surface of the inner side wall 70 on the side of a tip end thereof, and a second inner holding lip 114 is formed to project from the exterior surface of the inner side wall 70 in the vicinity of a joint between the inner side wall 70 and the bottom wall 72. Two recesses are defined by bending the door outer panel 80 of the door frame 12, and the first inner holding lip 112 and the second inner holding lip 114 are fit in these recesses. As a result, the glass run 62 can be held with the door frame 12 by virtue of the channel 78 and these recesses.

As shown in FIG. 2, the corner section 66 of the glass run 62 is provided by joining the extruded straight sections 64 defining the upper side portion and the rear vertical side portion of the glass run 62, respectively, by molding. The corner section 66 has a cross-sectional shape similar to that of the extruded straight section 64. A main body of the corner section 66 has an outer side wall, an inner side wall and a bottom wall with a generally U-shaped cross-section. In the corner section 66, the cross-sectional shape of the upper side portion of the glass run 62 gradually varies to that of the rear vertical side portion thereof.

The straight sections 64 of the glass run 62 are formed of a synthetic rubber such as an EPDM rubber, or a thermoplastic elastomer such as a polyolefin elastomer, etc.

Where the synthetic rubber is used, after extruded, it is heated for vulcanizing in a vulcanization chamber with a hot air, high frequency wave, etc. Where the thermoplastic elastomer is used, it is cooled for solidifying. Then, the resultant material is cut to obtain extruded members, each having a predetermined length.

Next, the corner sections 66 of the glass run 62 are molded by cutting the thus obtained extruded members to predetermined dimensions at generally right angles to the longitudinal direction thereof, placing cut ends of the extruded members in a mold, and injecting a solid material in a cavity of the mold. The molded corner section has a generally identical cross-section to that of each of the extruded members. It is preferable that the material for the molded corner section is of the same kind as the material for the extruded members. Where the thermoplastic elastomer is used, the material is in a molten state when injected into the mold so that the molded section is integrally welded to the extruded members with heat and pressure thereof.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for a motor vehicle, which is adapted to be attached along an inner periphery of a door frame of a vehicle door for guiding a door glass as the door glass is raised and lowered, the glass run comprising:
   a main body comprising an outer side wall, an inner side wall, and a bottom wall, which define a generally U-shaped cross-section, a first outer seal lip and an inner seal lip respectively extending from said outer side wall and said inner side wall so as to respectively extend from ends of said outer side wall and said inner side wall in an interior of said main body with the generally U-shaped cross-section, thereby respectively sealing outer and inner surfaces of the door glass,
   wherein an extension part is provided to extend from said end of said outer side wall of the glass run for attachment to vertical side portions of the door frame in an extending direction of said outer side wall, and a second outer seal lip is provided to extend from a tip end of said extension part in a direction of a front side of a vehicle body such that said second outer seal lip seals the outer surface of the door glass on a front side of a part sealed with said first outer seal lip,
   wherein a garnish is secured on an outer side of the door frame, and a tip end of said garnish contacts an exterior surface of said extension part,
   wherein said extension part comprises a recess in said exterior surface thereof such that said tip end of said garnish contacts said recess while providing a gap between said tip end of said garnish and a front end of said recess,
   wherein a base of said second outer seal lip is located on a front side of said tip end of said garnish,
   wherein a first outer cover lip covers a channel secured to a door outer panel of the door frame and wherein the channel is configured to have an L-shaped cross-section, and
   wherein the channel and the door outer panel of the door frame define a generally U-shaped cross section to hold the glass run.

2. A glass run as claimed in claim 1, wherein said extension part projects from said end of said outer side wall in parallel with said outer side wall.

3. A glass run as claimed in claim 1, wherein said extension part has an extending length ranging from 3 to 5 mm.

4. A glass run as claimed in claim 1, wherein said glass run is attached to a rear vertical side portion of a front door.

5. A glass run as claimed in claim 1, wherein the recess is formed between the first outer cover lip provided at said end of the outer side wall and a second outer cover lip provided at the tip end of the extension part.

6. A glass run as claimed in claim 5, wherein the first outer cover lip and the second outer cover lip project from a side surface of said extension part.

7. A glass run as claimed in claim 6, wherein the second outer seal lip projects from another side surface of said extension part that opposes said side surface of said extension part.

8. A glass run as claimed in claim 5, wherein said front end of said recess comprises a base of the second outer cover lip.

9. A glass run as claimed in claim 1, wherein one end of the channel is secured to the door frame and another end of the channel is folded to contact an exterior surface of the outer side wall.

10. A glass run as claimed in claim 1, wherein the glass run is held by an end of the door outer panel of the door frame and a part of the channel that has the L-shaped cross-section.

11. A glass run as claimed in claim 1, wherein a seal lip is disposed in an exterior surface of the bottom wall on a side of the outer side wall to contact a bottom surface of the channel for providing a seal between the door frame and the glass run.

12. A glass run as claimed in claim 1, wherein the glass run includes straight sections which are formed by extrusion, and corner sections which are formed by molding to join the straight sections to each other in conformity with corners of the door frame.

13. A glass run as claimed in claim 1, wherein the glass run includes extruded straight sections, and molded corner sections for joining the extruded straight sections to each other in conformity with corners of the door frame.

* * * * *